United States Patent

Miller

[11] 4,060,178
[45] Nov. 29, 1977

[54] METERING PUMP

[75] Inventor: Herbert L. Miller, Roselle, Ill.

[73] Assignee: Miller Mfg. Co. of Schiller Park, Inc., Addison, Ill.

[21] Appl. No.: 605,630

[22] Filed: Aug. 18, 1975

Related U.S. Application Data

[60] Continuation of Ser. No. 468,935, May 10, 1974, abandoned, which is a division of Ser. No. 305,255, Nov. 10, 1972, Pat. No. 3,851,798.

[51] Int. Cl.² .......................... G01F 11/08; F04B 9/04; F04B 13/00
[52] U.S. Cl. .................... 222/14; 222/226; 222/288; 222/333; 192/48.2; 417/429; 417/473
[58] Field of Search ................. 222/14, 135, 255, 288, 222/266, 275, 333; 417/319, 429, 473, 539; 192/26, 48.2, 81 C

[56] References Cited

U.S. PATENT DOCUMENTS

| 862,867 | 8/1907 | Eggleston | 417/395;472 X |
| 2,244,106 | 6/1941 | Granberg et al. | 417/429 X |
| 3,299,633 | 1/1967 | Cass | 417/539 X |
| 3,382,811 | 5/1968 | Chastang et al. | 417/539 X |
| 3,401,639 | 9/1968 | Swertfeger et al. | 417/319 |

FOREIGN PATENT DOCUMENTS 171,582 12/1951 Germany ........................... 417/473

Primary Examiner—Robert B. Reeves
Assistant Examiner—Frederick R. Handren
Attorney, Agent, or Firm—Mason, Kolehmainen, Rathburn & Wyss

[57] ABSTRACT

A metering pump for dispensing liquid having a pair of bellows type positive displacement pump chambers having different displacement volumes and interconnected in parallel to common inlet and outlet passages and a pair of independently controllable drive mechanisms for selectively interconnecting said pumps with a common power source for reciprocally activating each pumping chamber for a selected number of displacement cycles.

9 Claims, 10 Drawing Figures

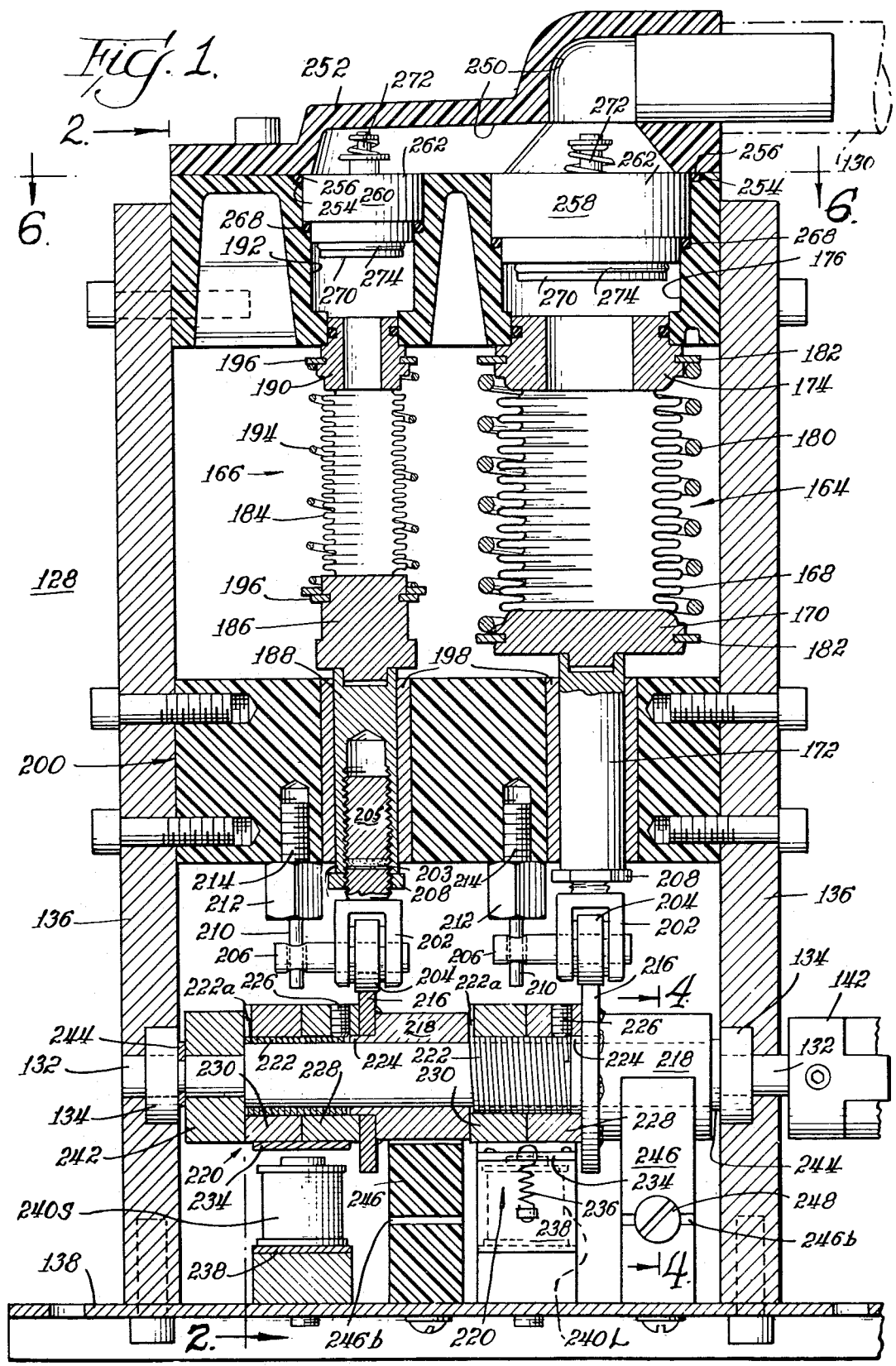

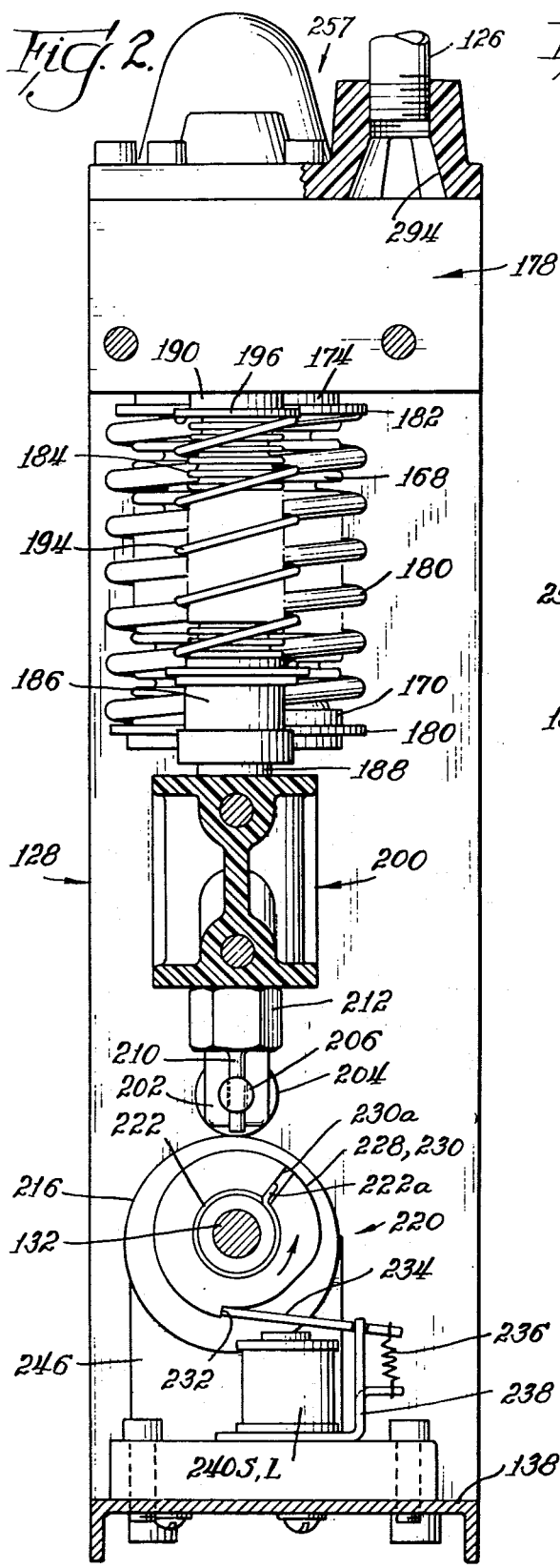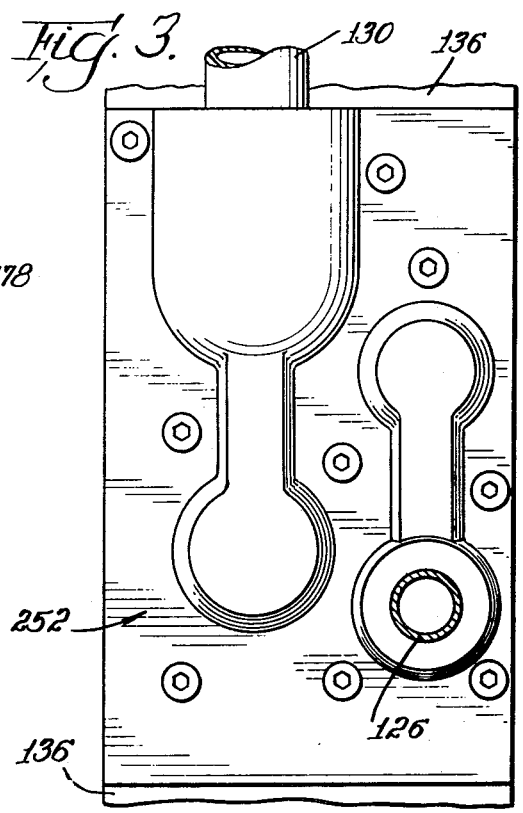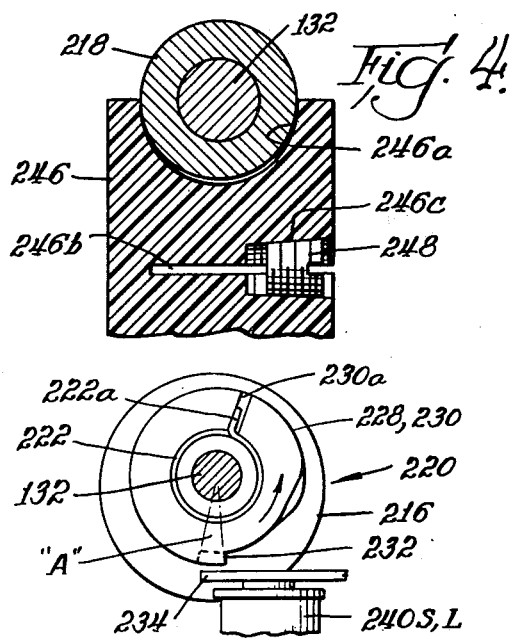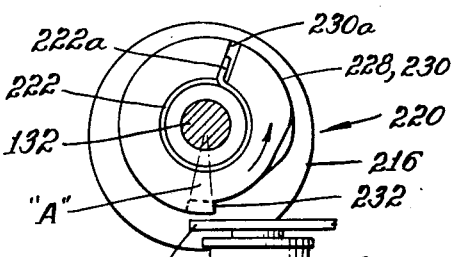

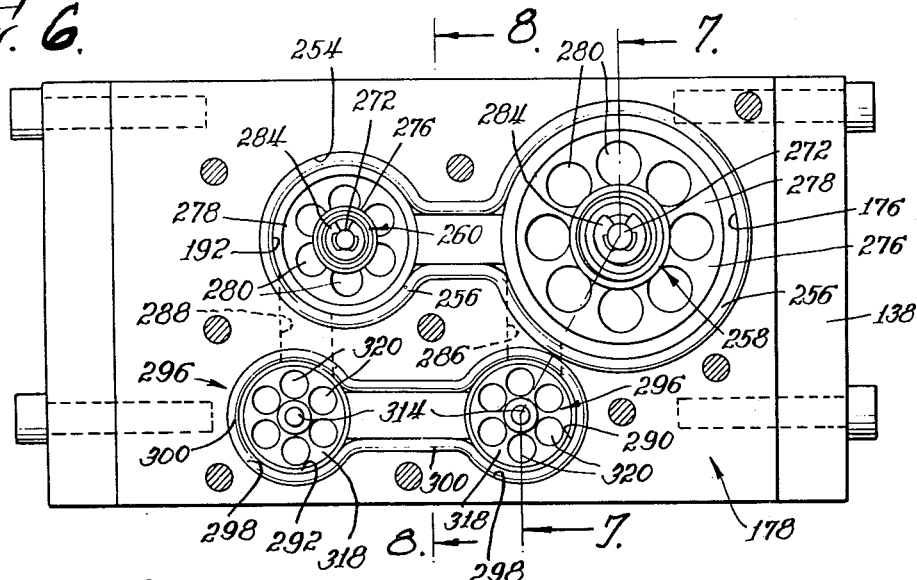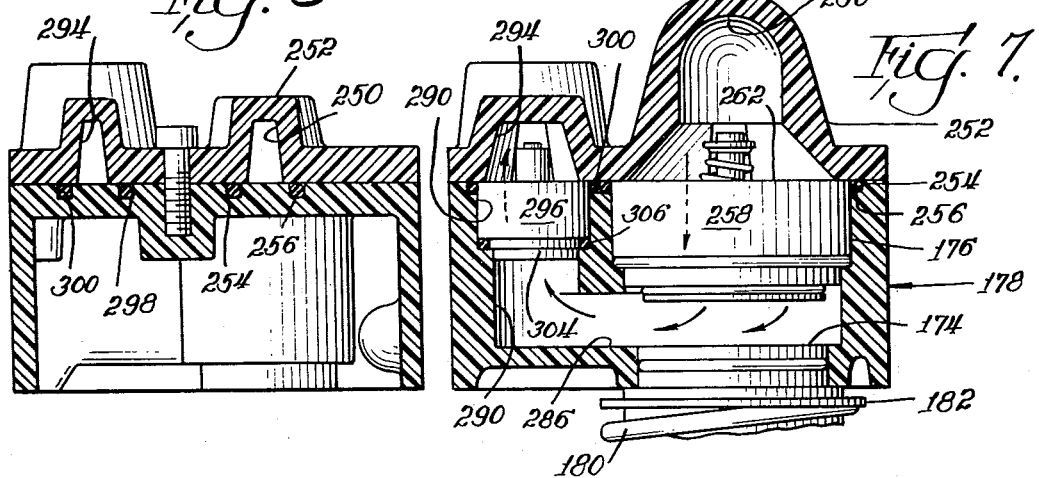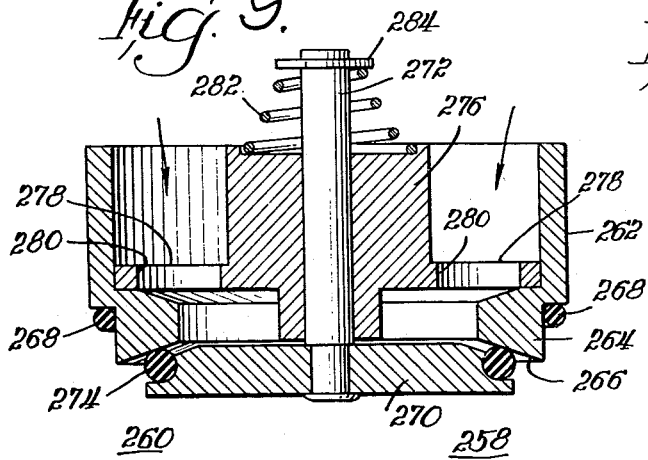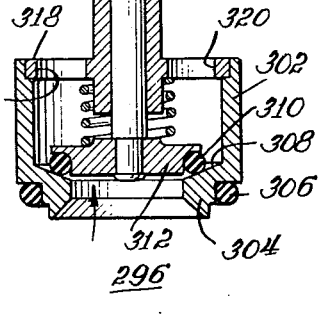

METERING PUMP

This application is a continuation of copending U.S. Patent Application Ser. No. 468,935 filed May 10, 1974, abandoned, which application Ser. No. 468,935 is a division of copending U.S. Application Ser. No. 305,255, filed Nov. 10, 1972, now U.S. Pat. No. 3,851,798.

The present invention relates to a new and improved metering pump for liquids such as colorants for paint and the like. In formulating paints a wide variety of colors are provided by using a relatively small number of colorant liquids. Precise metering of these colorant liquids is a necessity in providing a wide variety range of color hues and shades on a reproducible basis.

An object of the present invention is to provide a new and improved metering pump for precisely measuring a quantity of liquid to be dispensed.

Another object of the invention is to provide a metering pump which is accurate in metering liquid over an extremely wide range of values ranging from a fraction of a fluid ounce to as high as 10 fluid ounces.

Another object of the present invention is to provide a new and improved metering pump without any pistons having moving seals.

Another object of the present invention is to provide a new and improved highly accurate metering pump having a pair of positive displacement pumping chambers without moving seals therein.

Another object of the present invention is to provide a new and improved metering pump having a pair of positive displacement pumping chambers of different displacement volumes each of which is independently programmed for a desired number of displacement strokes in accordance with the quantity of liquid required.

The foregoing and other objects of the present invention are accomplished in an illustrative embodiment which includes a new and improved metering pump having a pair of positive displacement pumping chambers connected in parallel to common inlet and outlet passages, each pumping chamber having no moving seals or pistons therein and having displacement volume different than the other. A pair of independently controllable drive mechanisms for selectively interconnecting the pumping chambers with a common power source are provided for reciprocally activating the pumping chambers through a selected number of displacement cycles to accurately dispense the desired quantities of liquid.

For better understanding of the invention, reference should be had to the following detailed description taken in conjunction with the drawings in which:

FIG. 1 is a vertical, cross-sectional view of a metering pump in accordance with the features of the present invention;

FIG. 2 is a vertical, cross-sectional view taken substantially along line 2—2 of FIG. 1;

FIG. 3 is a top plan view of the metering pump of FIG. 1;

FIG. 4 is a fragmentary, cross-sectional view taken substantially along line 4—4 of FIG. 1;

FIG. 5 is a fragmentary vertical, cross-sectional view illustrating the same mechanism as the lower portion of FIG. 2, but showing a clutch mechanism in the engaged position;

FIG. 6 is a horizontal, cross-sectional view taken substantially along line 6 of FIG. 1;

FIG. 7 is a vertical, cross-sectional view taken substantially along line 7—7 of FIG. 6;

FIG. 8 is a vertical, cross-sectional view taken substantially along line 8—8 of FIG. 6;

FIG. 9 is an enlarged, vertical, cross-sectional view illustrating an inlet check valve in accordance with the features of the present invention; and FIG. 10 is an enlarged, vertical, cross-sectional view of an outlet check valve in accordance with the features of the present invention.

In accordance with the present invention a new and improved metering pump 128 includes a rotary drive shaft 132 supported adjacent opposite end portions in bearings 134 seated in a pair of upright structural members 136. The upright members 136 are formed of substantially thick aluminum plate or the like and are secured to a base member 138. The rotary shaft 132 of the pump is driven by a suitable drive motor (not shown) through a shaft coupling 142.

The metering pump includes a large volume positive displacement pumping chamber 164 and a small volume positive displacement pump chamber 166. The large and small pumping chambers are connected to operate in parallel and are independently controlled so either one of the two or both of the pumping chambers may be operated while the shaft 132 is rotating. The large volume pumping chamber 164 includes a relatively large diameter bellows chamber having a thin wall of stainless steel and indicated by the reference numeral 168, as best shown in FIG. 1. The lower end of the bellows chamber 168 is permanently connected to a circular closure member 170 having a cylindrical projection on the center thereof extending downwardly for alignment and seating within a recess in the upper end of a reciprocating thrust pin 172. The upper end of the bellows 168 is connected to a fixed annular upper end ring member 174 having a shouldered upper end portion seated in the lower end of an inlet bore having stepped diameters and formed in a valve housing member 178 secured between the upstanding side members 136 by suitable fastening means, as best illustrated in FIGS. 1 and 6. The lower end closure 170 of the large pumping chamber 164 is biased downwardly away from the fixedly positioned upper ring member 174 by means of a concentric coil spring 180 normally under compression and held between upper and lower retaining washers 182 seated within grooves in the respective members 174 and 170. The small volume pumping chamber 166 includes a smaller diameter stainless steel thin walled bellows 184 closed at its lower end by a generally cylindrical lower closure member 186. The lower end closure 186 includes a downwardly projecting cylindrical boss for centering engagement within the recess in the upper end of a reciprocating thrust pin 188. The upper end of the bellows 184 is sealed against the lower end of an annular upper end ring member 190 having its upper end seated and sealed within the lower end of a stepped diameter inlet bore 192 formed in the valve housing member 178. The lower closure 186 is similarly biased downwardly away from the upper end member 190 by a coaxial spring 194 retained under slight compression by means of a pair of upper and lower retaining rings 196 seated in grooves provided in the respective members 190 and 186. The large and small positive displacement variable volume pumping chambers 164 and 166 defined by the respective large and small bellows 168 and 184 provide for the delivery of precisely metered quantities of liquid colorants to a dispensing outlet conduit 126 in response to the reciprocation of the thrust pins 172 and 188 which are independently and selectively drivingly interconnected with the rotating shaft 132.

The thrust pins 172 and 188 are supported in bearing sleeves 198 seated in parallel vertical passages provided in a bearing support block 200 extending transversely between the pump frame uprights 136 and secured thereto by suitable fasteners. The thrust pins 172 and 188 are provided with internally threaded axial bores open at the lower end, and the thrust pin 172 is drivingly interconnected to the rotary shaft 132 by means of an adjustable thrust linkage member 202 having a bifurcated lower end portion in which is mounted a cam follower roller 204 carried on a shaft 206 projecting outwardly to the left as seen in FIG. 1. The link member 202 includes an upwardly extending threaded shank which is engaged within the internally threaded axial bore in the lower end of the thrust pin 172. The threaded shank is formed with a groove having a fiber ring 203 therein for compressive engagement with the threads to prevent backlash. Adjustment between member 202 and the thrust pin 172 is obtained by relative rotation of the two members and a lock nut 208 is provided to positively secure the members 172 and 202 in a selected adjustment.

In order to prevent rotation of the shaft 206 about a vertical axis during driven reciprocation the shaft is formed with a drilled passage adjacent the projecting outer end which is engaged for sliding movement on a guide pin 210 depending downwardly from a guide member 212 having an upwardly extending shank 214 threaded into a blind threaded bore provided in the bearing support member 200.

The cam follower roller 204 is adapted to be driven by a circular cam secured to one end of a cylindrically shaped annular collar 218 mounted for free rotation on the rotary shaft 132. The circular cam 216 is eccentric with respect to the axis of the shaft 132 and the amount of eccentricity determines the length of stroke of the thrust pin 172 and consequently the displacement of the large volume pumping chamber 164 each time the cam completes one revolution.

In order to drivingly interconnect the cam 216 with the rotating shaft 132 to reciprocate the thrust pin 172 for any selected number of reciprocal cycles, the metering pump system 128 is provided with a large pump clutch assembly generally indicated by the reference numeral 220. The clutch assembly includes a coil spring 222 wound from square cross section spring wire with an internal diameter slightly smaller than the diameter of the rotating shaft 132 when no torsional forces are applied tending to uncoil the spring. The spring is mounted on the rotary shaft 132 with one end adjacent and secured against an annular ring 224 on one side of the cam 216 by means of a set screw 226 carried in a radial bore provided in a first annular clutch collar 228 mounted on a right hand half or portion of the coil spring 222 around the shaft 132. The clutch assembly 220 also includes a second annular clutch collar 230 around the opposite or left portion of the internal coil spring 222 having a radial groove 230a formed in the outside face for receiving a radial tang 222a on the outer coil of the spring.

As best shown in FIGS. 2 and 5 the clutch rings 228 and 230 are shaped with radial detent faces 232 adapted to be engaged by the outer end of a pivotally movable latch member 234. As viewed in FIGS. 2, 4 and 5 the rotary shaft 132 is driven in a counterclockwise direction indicated by the arrow and when the detent faces on the clutch rings 228 and 230 are held in aligned position with the latch 234 in the engaged position as shown in FIG. 2, the clutch spring 222 is slightly unwound so that its internal diameter is large enough to permit the shaft 132 to rotate therein. When the latch 234 is moved out of the latch position, the coil spring 222 tends to tightly coil around the shaft and the clutch ring 230 rotates relative to the adjacent ring 228 by an angular increment presented by the numeral A in FIG. 5. Because the coils of the spring 222 are formed of rectangular square cross section spring wire a substantial surface on the interior of the coils engages and grips the shaft when the latch 234 is moved out of engagement with the clutch rings 228 and 230 permitting the ring to coil tightly around the shaft. As this occurs the clutch engages the shaft to drive the eccentric cam 216 until such time as the latch 234 is returned to a normal upward or latching position as shown in FIG. 2 wherein the detent faces 232 are again aligned and the coil spring 222 is slightly unwound to permit free rotation of the shaft 132 within the interior of the spring coil.

A small pump clutch assembly 220 identical to the large pump clutch assembly is provided with a similar cam and follower mechanism connected to the thrust rod 188 for activating the small pump bellows 184 of the small pump chamber 166. As viewed in FIG. 1 the left hand and right hand clutch assemblies 220 for activating the respective small and large volume pumping chambers 166 and 164 respectively, are independent of one another in that the latch members 234 for each clutch assembly are independently activated. The follower linkages 202 for both large and small pumps are identical and in FIG. 1 for the small pump linkage the compressible fiber washer 203 is shown in the sectional view illustrating the threaded shank 205 of the follower mechanism 202 extending upwardly into the internal bore of the thrust pin 188.

As illustrated in FIG. 2 when the clutch assemblies 220 are disengaged with the latch member 234 in the upward or latched position with the detent surfaces 232 on adjacent clutch collars 228 and 230, the respective cams 216 are positioned approximately 45° or one-eighth of a revolution above bottom dead center. Accordingly when one or both latch members 234 is retracted, the clutch assemblies 220 become engaged to drive one or both of the respective thrust members 188 and 172. As the thrust members initially move downwardly the bellows 168 and/or 184 expand in volume until bottom dead center is reached after approximately one quarter of a revolution. If only a single cycle of displacement is required from either or both of the pumps, as soon as the detent faces 232 move past the latching edge of the latch members 234, the latch members are released and biased upwardly against the surface of the clutch collars 228 and 230 by means of latch springs 236. The latch members 234 are pivotally supported at the upper end of L-shaped brackets 238 and the springs 236 normally cause the latch members to tilt up as shown in FIG. 2 and engage the detent faces 232.

In order to release the faces and engage the clutch the large bellows pumping clutch assembly 220 is provided with a solenoid coil 240L and the small bellows latch assembly is provided with a similar or identical solenoid coil indicated by the number 240S which is controlled by a separate clutch drive latch. If a solenoid coil is energized, its latch member 234 is pulled down and out of the latch up condition as shown in the FIG. 5 and the respective clutch assembly 220 controlled thereby is then engaged to rotate its cam 216 along with the shaft 132 and reciprocate the respective thrust pins 172 and 188. When a solenoid coil 240L or 240S is deenergized, its spring 236 causes the respective latch member 234 to pivot upwardly and engage the detent face 232 of the clutch collars 228 and 230 thus unwinding the coil spring 222 slightly and permitting the shaft 132 to rotate freely within the enlarged coils of the springs. In these clutch disengaging conditions the cams 216 cease to rotate.

In accordance with the present invention, it has been found that by starting the pumping cycle of a bellows at a point 45° above a bottom dead center position, surges or excess volume of liquid on the initial engagement of the clutch is eliminated substantially from that encountered if the cycle is started from precisely a bottom dead center position. It has been found in tests that if only a single cycle is to be provided the volumetric accuracy of pumping cycle decreases substantially when the cycle starts from a bottom dead center condition wherein the bellows has a maximum volume when compared to a cycle wherein the starting point is above bottom dead center and initially the bellows expands as the thrust pin is moved downwardly toward bottom dead center. The problem does not seem to occur on subsequent cycles of pumping after the initial or first one. The pump thus provides extremely accurate volumetric dispensing of liquid even when only a single displacement cycle of the small pumping chamber is used which may be in the order of 1/96th of a fluid ounce.

As viewed in FIG. 1 a spacer bushing 242 is provided for the clutch assembly 220 of the small volume pump 166 between the collar 230 and the adjacent upright frame member 136. A pair of C-ring type retaining washers 244 are provided adjacent opposite ends of the shaft 132 inside the bearings 134 to secure the shaft against axial displacement as it rotates.

In order to provide braking action on the collars 218 and their associated cams 216 so that the cams will come to substantially the same stopping position after latchup of the clutch members 234 occurs by de-energizing either or both of the solenoids 240S or 240L, there is provided a pair of brake assemblies best shown in FIG. 4, including upstanding brake blocks 246 formed of "Nylon" Phenolic resin, grade "C", or other suitable plastic material. Each block is provided with a semi-cylindrical braking surface 246a (FIG. 4), adapted to brakingly engage the outer periphery of the collar 218. The brake block 246 is provided with a horizontal slot 246b intermediate its end and terminating at a blind end as shown in FIG. 4. A threaded bore 246c is formed to extend partway into the slot 246b and a slightly tapered threaded set screw 248 is provided for adjusting the brake pressure by tightening or loosening the set screw within the bore. The action of the braking surface 246a against the collars 218 prevents backlash from occurring as the clutch assemblies are engaged and disengaged and provides for precise driving rotation of the respective cam members 216 without backlash at the beginning or end of a rotative cycle.

As previously indicated on each complete revolution of the shaft 132 while the clutch mechanisms 220 are engaged, the cams 216 rotate from a starting position approximately 30° of cam rotation above bottom dead center. Because the cams start at a position intermediate bottom and top dead center, the acceleration forces on the thrust rods 172 and 188 on stopping and starting are considerably smaller than if the starting or stopping was at the end of a stroke or at the beginning of stroke reversal where acceleration forces are at a maximum. After bottom dead center is passed, the rotating cams begin to elevate the link assemblies 202 upwardly causing compression of the respective large and small pumping chambers 164 and 166 until top dead center position is reached. At this point the link assemblies begin to move downwardly and if only a single cycle of rotation is provided the clutch assemblies are disengaged by de-energizing one or both of the solenoid coils 240S and 240L so that the latch members 234 are biased upwardly by the springs 236 and engage the stop surfaces 232 on the clutch collars 228 and 230. When this occurs the coil spring 222 is unwound slightly to permit the rotary shaft 132 to rotate within the turns of the coil. Action of the brake blocks 246 and the surfaces thereof 246a on the cam collars 218 prevents oscillation and backlash of the cams 216 as rotation is stopped and latchup occurs.

In a working embodiment of the pump 128 constructed in accordance with the features of the present invention, the circular cams 216 were positioned to be approximately one eighth inch eccentric of the axis of rotation of the shaft 132 so that the length of stroke between bottom and top dead center is approximately one quarter inch. The bellows structures 168 and 184 are in the range of 2 to 2½ inches long so that the amount of compression on the bellows is a relative low percentage of the total bellows length and the stress involved is minor resulting in extremely long life and low stress on associated equipment. Because there are no moving seals with a bellows arrangement as shown, there is no possibility for colorant leakage around a sliding piston or the like, a difficulty that has characterized many of the prior art pumping devices.

Preferably the respective large and small pumping assemblies 164 and 166 are dimensioned with different displacement volumes so that the displacement volume of the small bellows is a fractional portion of the displacement volume of the large bellows. For example, if the displacement volume of the small bellows 184 is dimensioned to provide 1/100th of a fluid ounce on a reciprocal stroke, the displacement volume of the larger bellows 168 may be set up to be ten or eight times as large with a volume of 1/10 or 1/8 of a fluid ounce. Accordingly, if it is desired to dispense 1/10 or 1/8 of an ounce of liquid the clutch assembly 220 for the large volume displacement pump 164 may be engaged for one shaft revolution or, in the alternative, the clutch assembly 220 for the small volume pumping assembly 166 may be engaged for a total of ten or eight shaft revolutions providing eight pumping strokes for the small bellows assembly 184 to provide 1/10 or 1/8 of a fluid ounce. Because the large volume and small volume pumping assemblies are operating in parallel it is possible to provide for precisely metered values of dispensing volumes over a wide range by selectively and independently engaging the two clutch assemblies 220 with the coils 240S and/or 240L. The biasing springs 180 and 194 continuously bias the rollers 204 of the cam follower linkage assemblies 202 against the circular cams 216 and cams having different eccentricity in relation with the shaft 132 may be provided to change the displacement volume of the respective large and small pumping chambers as desired.

In accordance with the invention, liquid from a reservoir or the like flows into an inlet or supply passage 250 provided in a cover member 252 secured to the upper surface of the valve housing 178 of a respective metering pump 128. As best shown in FIGS. 1 and 6 the liquid inlet passage 250 is in communication with the upper ends of the stepped diameter liquid inlet passages 176 and 192 which are in communication with the upper ends of the respective large and small bellows 168 and 184. The inlet passage or bore 176 of the large bellows is larger in diameter than the passage 192 which communicates with the small size bellows and as shown in FIG. 6 the upper surface of the housing member 178 is formed with a generally figure 8 shaped groove 254 having a suitably shaped resilient sealing gasket 256 seated therein to provide a seal between the confronting surfaces of the valve housing member 178 and cover member 252 around the inlet passage 250 communicating between the upper ends of the stepped diameter liquid inlet passages 176 and 192.

In accordance with the present invention, a relatively large size intake check valve 258 is seated in the upper end of the bore 176 to permit liquid to flow downwardly and enter the upper end of the large volume pumping chamber 164. A similar but smaller check valve 260 is seated in the upper end of the inlet bore 192 leading to the small volume pumping chamber 166 to permit incoming liquid to flow from the passage 250 downwardly into the upper end of the small volume pumping chamber. The check valves 258 and 260 are identical except for size and are illustrated in detail in FIG. 9. The valves include a hollow annular body 262 having a thickened lower end portion 264 extending inwardly and forming an upwardly concave frustoconical valve seating surface 266. A recess is formed adjacent the lower outer end of the valve body to accommodate an O-ring sealing washer 268 which seats in a stepped diameter shoulder portion formed in the bore 176 of the valve housing member 178. A circular valve disk 270 is staked onto the lower end of a reciprocating valve stem 272 for movement toward and away from the concave conical valve seat 266. An O-ring seal 274 is seated in a groove on the upper surface of the valve disk around the periphery thereof for sealing engagement against the conical valve seating surface 266. The valve stem 272 is supported for reciprocation in the central bore of a spider 276 having a generally cylindrical central body portion in which the stem bore is defined and an outwardly extending flange 278 formed with a plurality of circumferentially spaced circular liquid passages 280 therein. The O-ring 274 is biased upwardly by the valve disk 270 and stem 272 for sealing engagement against the conical seating surface 266 by means of a bias spring 282 having a lower end coil seated in a recess provided in the central portion of the spider member and an upper end compressed beneath a retaining washer 284 seated in a groove adjacent the upper end of the valve stem.

As best indicated in FIGS. 1, 7 and 9, liquid entering the passage 250 from the supply tube 130 leading to a reservoir 104 may flow freely down the interior of the valve body 260 and through the circular openings 280 and the spider flange 278. Dependent upon the amount of suction below the valve disk 270 caused by a downward stroke of the thrust pin 172 expanding the volume of the large bellows 68, the fluid flows freely past the O-ring 274 into the lower end of the bore 176. The fluid pressure below the valve disk 270 becomes greater than the pressure above when an upward stroke of the thrust pin 172 causing a contraction of the bellows volume is commenced and the O-ring seal 274 is then compressed tightly against the conical valve seal 266 of the check valve so that reverse flow is prevented. The same operation pertains to the smaller inlet check valve 260 positioned above the small volume pumping chamber 166 in the small inlet passage 192 in the valve housing member 178.

When one or both of the bellows 168 or 184 is compressed or contracting in volume the fluid trapped below the check valves 258 and 260 in the respective passages 176 and 192 is under increased pressure and is forced out through a pair of transverse flow passages 286 and 288 (FIG. 6) formed in the valve housing member 170 to extend between the lower end of the inlet passages 176 and 192 respectively and a pair of vertical, outlet or pressure passages 290 and 292 respective. The vertical outlet or pressure passages 290 and 292 are formed in the valve housing member 178 of substantially the equal diameter and are stepped in diameter as best shown in FIG. 7 between the minimum adjacent the lower end in communication with the cross passages 286 and 288. The upper ends of the vertical outlet passages 290 and 292 are in communication with a common outlet passage 294 formed in the valve housing cover member 252 and having a threaded outlet at one end for receiving the threaded end portion of one of the pressure lines 126 leading to the dispenser nozzle assembly 52. Seated in the upper end portion of each vertical outlet passage 290 and 292 is provided an outlet check valve 296 (FIG. 10) which permits an upward flow of pressurized liquid and prevents back flow in a downward direction.

As best shown in FIG. 6 a generally figure 8-shaped groove 298 is formed in the upper surface of the valve housing member 178 around the upper end of the vertical outlet passages 290 and 292 in order to accommodate a similarly shaped gasket 300 for sealing in the abutting surfaces of the cover member 252 and the valve housing member 178 around the outlet passage 294 extending between the vertical passages 290 and 292.

The outlet check valves 296 include a cylindrical annular body 302 having a thickened portion 304 adjacent to the lower end and a shoulder on the outer lower end of the body forms a recess for accommodating an O-ring for sealing against an abutting stepped shoulder in one of the vertical outlet passages 290 and 292. A frustoconical upwardly concave seating surface 308 is defined internally of a thickened lower outer rim portion 304 for sealing engagement with an O-ring 310 carried in a peripheral groove on the lower side of a circular valve disk 312. The valve disk 312 is staked onto the lower end of an axial valve stem 314 which is mounted for reciprocal movement in a central bore defined within a spider assembly 316 having a center portion defining the bore and an outwardly extending flange 318 intermediate its ends having the outer periphery thereof seated within a groove formed in the upper end of the valve body 302. The flange 318 is formed with a plurality of circumferentially spaced circular liquid passages 320 for accommodating an upward flow of liquid when the pressure below the valve disk 312 is great enough to lift the O-ring 310 off of the vertical valve seating surface 308 on an upward stroke of the thrust pin 172 or 188 when causing the large and/or small bellows 168 and 184 to contract in volume. The check valves 296 prevent reverse downward flow of liquid back into the inlet or suction side of the system.

From the foregoing it will be seen that the valve housing member 178 and cover member 252 attached thereto provide means for directing the liquid flow in accordance with the operation of the large volume and small volume pumping chambers 164 and 166 of the metering pump 128.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A metering pump comprising a pair of positive displacement pumping chambers having different displacement volumes, liquid supply passage means having an inlet and in communication with both of said pumping chambers, inlet check valve means for permitting liquid flow into said pumping chambers during expansion thereof from said liquid supply passage means, liquid discharge passage means having an outlet and in communication with both of said pumping chambers, outlet check valve means for permitting the discharge of metered liquid from said pumping chambers upon contraction of the same into said discharge passage means, power means for expanding and contracting said respective chambers automatically through a preselected number of repetitive identical pumping cycles, and means independently controllable for each of said pumping chambers for automatically and selectively interconnecting of disconnecting said power means and a respective pumping chamber for operating each pumping chamber for a required number of cycles corresponding to said preselected number to automatically meter a precise volume of liquid into said discharge passage means.

2. The metering pump of claim 1 wherein each of said pumping chambers comprises a thin walled annular bellows chamber fixedly supported at one end and having an opposite end reciprocally driven toward and away from said fixed one end to expand and contract the volume thereof.

3. The metering pump of claim 2 wherein said power means is selectively interconnected with said pumping chambers to reciprocally move said opposite end of said pumping chambers to provide a metered flow of liquid therefrom into said outlet passage means.

4. The metering pump of claim 2 wherein said power means includes a rotary drive shaft and said independently controllable means includes a pair of independently controllable drive mechanisms for selectively drivingly interconnecting said drive shaft with said respective pumping chambers to pump a metered flow of liquid therefrom.

5. The metering pump of claim 4 wherein said drive mechanisms drivingly interconnect said opposite ends of said pumping chambers with said rotary drive shaft to reciprocate said opposite ends during rotation of the shaft.

6. The metering pump of claim 5 wherein each of said drive mechanisms include cam means rotatably mounted on said shaft, cam follower means engaging said cam means for reciprocating said opposite end of said bellows chambers upon rotation of said cam means, and clutch means for drivingly interconnecting said rotary shaft and said cam means.

7. The metering pump of claim 6 including spring means for biasing said cam follower means against said cam means.

8. The metering pump of claim 6 including stop means for holding said cam means in a fixed position disengaging said clutch means.

9. The metering pump of claim 8 wherein said cam means in said fixed position maintains said bellow chambers in a partially contracted condition, means biasing said bellows chamber toward an expanded condition, said rotary shaft drivingly engaging said cam means upon initial engagement of said clutch means permitting expansion of said bellows chamber.

* * * * *